(12) United States Patent
Iwasaki

(10) Patent No.: US 8,384,767 B2
(45) Date of Patent: Feb. 26, 2013

(54) STEREOSCOPIC IMAGE PICKUP APPARATUS AND METHOD OF ADJUSTING OPTICAL AXIS

(75) Inventor: Hiroyuki Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1372 days.

(21) Appl. No.: 12/055,404

(22) Filed: Mar. 26, 2008

(65) Prior Publication Data
US 2008/0239064 A1 Oct. 2, 2008

(30) Foreign Application Priority Data
Mar. 29, 2007 (JP) ................................. 2007-088139

(51) Int. Cl.
H04N 13/02 (2006.01)

(52) U.S. Cl. ................................ 348/47; 348/42; 348/46

(58) Field of Classification Search .......................... None
See application file for complete search history.

(56) References Cited

U.S. PATENT DOCUMENTS

| | | | | |
|---|---|---|---|---|
| 4,999,713 A | * | 3/1991 | Ueno et al. | 348/240.3 |
| 5,479,236 A | * | 12/1995 | Tanaka | 348/208.11 |
| 5,864,360 A | * | 1/1999 | Okauchi et al. | 348/47 |
| 6,762,794 B1 | * | 7/2004 | Ogino | 348/262 |
| 6,987,529 B1 | * | 1/2006 | Ito | 348/208.2 |
| 7,102,686 B1 | | 9/2006 | Orimoto et al. | |
| 7,583,308 B2 | * | 9/2009 | Kanai et al. | 348/335 |
| 7,586,534 B2 | * | 9/2009 | Suto et al. | 348/42 |

FOREIGN PATENT DOCUMENTS

| | | | |
|---|---|---|---|
| JP | 03151794 A | * | 6/1991 |
| JP | 06054349 A | * | 2/1994 |
| JP | 08-317424 A | | 11/1996 |
| JP | 2003-052058 A | | 2/2003 |
| JP | 2006-033346 A | | 2/2006 |

* cited by examiner

*Primary Examiner* — Jeffrey R Swearingen
(74) *Attorney, Agent, or Firm* — Sughrue Mion, PLLC

(57) ABSTRACT

A stereoscopic camera includes first and second image pickup units, having respectively first and second optical axes, for photographing an object to form two image frames. Two angle adjusters make angle adjustment of the optical axes. An object detector detects a human face as a principal object in the two image frames. An arithmetic processor obtains a shift amount of the face between two image frames, and determines an axial correction angle according to the shift amount for the angle adjustment in consideration of the face. A checker checks whether the angle adjustment should be made for both optical axes or for one thereof. A controller operates at least one of the two angle adjusters according to the axial correction angle and in response to information from the checker, for positioning the face equally between the two image frames optically by adjusting the first and/or second optical axis.

13 Claims, 11 Drawing Sheets

STEREOSCOPIC IMAGE PICKUP APPARATUS AND METHOD OF ADJUSTING OPTICAL AXIS

BACKGROUND OF THE INVENTION

1. Field of the Invention

The present invention relates to a stereoscopic image pickup apparatus and method of adjusting an optical axis. More particularly, the present invention relates to a stereoscopic image pickup apparatus in which an optical difference between two image pickup units can be corrected rapidly and by a simple structure, and a method of adjusting an optical axis.

2. Description Related to the Prior Art

A stereoscopic camera is known as an image pickup apparatus for creating and recording image data of a stereoscopic image. For example, JP-A 2006-033346 discloses the stereoscopic camera including a plurality of image pickup units, each of which picks up an object image of an object focused by a lens system. Image data from the image pickup units is obtained for the single object, to create the stereoscopic image data.

It is important in the stereoscopic camera to suppress offsetting of images due to offsetting of optical axes of the two image pickup units. JP-A 2003-052058 discloses a method of correcting offsetting of the optical axes. An shift amount of the optical axes is detected from two images obtained by the two image pickup units, to adjust an area of an image for being cropped after image pickup and a position of an image pickup device according to the shift amount.

JP-A 8-317424 discloses a method in which the shift amount of the optical axes are stored in association with focal lengths of the two lens systems, and the offsetting of the optical axes due to movement of a variator lens is corrected by changing an area to be read of an image according to the focal lengths or the position of the variator lens. U.S. Pat. No. 7,102,686 (corresponding to JP-A 11-355624) discloses the stereoscopic camera in which a first one of the image pickup units is kept slidable and rotatable from a second one of the image pickup units, so as to change an interval of the image pickup units, an angle of the optical axis and the like automatically.

However, the method of JP-A 2003-052058 and JP-A 8-317424 has a problem in that processing for changing the area to be read of an image requires considerably long time. The shift amount of the optical axes may not be corrected only by adjusting the area to be read of the image. If a position of an image pickup device requires adjusting, a problem arises in that the stereoscopic camera is likely to have an excessively large size. Also, the structure of U.S. Pat. No. 7,102,686 (corresponding to JP-A 11-355624) has a problem of an excessively large size because of sliding and rotating of the first one of the image pickup units relative to the second.

SUMMARY OF THE INVENTION

In view of the foregoing problems, an object of the present invention is to provide a stereoscopic image pickup apparatus in which an optical difference between two image pickup units can be corrected rapidly and by a simple structure, and a method of adjusting an optical axis.

In order to achieve the above and other objects and advantages of this invention, a stereoscopic stereoscopic image pickup apparatus has a first image pickup unit including a first lens system having a first optical axis, and a first image pickup device for generating an image signal of a first image frame by photoelectrically converting an object image. A second image pickup unit includes a second lens system having a second optical axis, and a second image pickup device for generating an image signal of a second image frame by photoelectrically converting an object image. There are first and second angle adjusters for angle adjustment of respectively the first and second optical axes. An object detector detects a principal object in the first and second image frames formed before stereoscopic image pickup. An arithmetic processor obtains a shift amount of the principal object between first and second image frames, and for determining an axial correction angle according to the shift amount. A checker checks whether the angle adjustment with the axial correction angle should be made for both of the first and second optical axes or for one thereof. A controller operates at least one of the first and second angle adjusters in response to a result from the checker, for positioning the principal object equally between the first and second image frames optically by adjusting at least one of the first and second optical axes according to the axial correction angle.

The first and second lens systems are zoom lens systems, and the object detector detects the principal object in the first and second image frames picked up while the zoom lens systems are set in a wide-angle end position by zooming.

The checker compares the axial correction angle with a maximum correction angle of the angle adjustment of the first angle adjuster, and if the axial correction angle is less than the maximum correction angle, determines carrying out the angle adjustment of the first optical axis, and if the axial correction angle is equal to or more than the maximum correction angle, determines carrying out the angle adjustment of the first and second optical axes.

Furthermore, there is a camera body. A dual lens adapter supports the first and second image pickup units in front of the camera body, and transmits information of the first and second image frames from the first and second image pickup units to the camera body.

The lens system includes a correction lens for constituting each of the first and second angle adjusters, the correction lens being movable in a plane perpendicular to the first and second optical axes for the angle adjustment.

Each of the first and second angle adjusters includes a shake corrector for detecting a shake of the camera body, and for determining a shift amount of the correction lens according to the detected shake for correction thereof, the shake corrector carrying out the angle adjustment with the axial correction angle.

The checker, if the axial correction angle is equal to or more than the maximum correction angle, compares the axial correction angle with a total of maximum correction angles of the angle adjustment of the first and second angle adjusters, and if the axial correction angle is equal to or more than the total of the maximum correction angles, causes the controller to disable the first and second image pickup units from image pickup.

Furthermore, first and second coupling devices mount respectively the first and second image pickup units on the dual lens adapter. A third coupling device mounts the dual lens adapter on the camera body. The third coupling device has a shape of compatibility with each of the first and second coupling devices, and in a normal mode without adapter application, the first and second image pickup units are selectively mountable on the camera body directly.

The principal object is a human face, and the object detector is a face detector.

The first and second angle adjusters are incorporated in respectively the first and second image pickup units.

In one aspect of the invention, an optical axis adjusting method for a stereoscopic image pickup apparatus is provided, the stereoscopic image pickup apparatus including first and second image pickup units, having a lens system disposed on respectively first and second optical axes, for picking up an object image photoelectrically to form first and second image frames, and first and second angle adjusters for angle adjustment of the first and second optical axes. In the optical axis adjusting method, a principal object is detected in the first and second image frames. A shift amount of the principal object is obtained between first and second image frames. An axial correction angle is determined according to the shift amount for the angle adjustment in consideration of the principal object. It is checked whether the angle adjustment should be made for both of the first and second optical axes or for one thereof. At least one of the first and second angle adjusters is operated according to the axial correction angle and in response to a result of the checking step, for positioning the principal object equally between the first and second image frames optically by adjusting at least one of the first and second optical axes.

The lens system is movable for zooming, and in the object detecting step, the principal object is detected in the first and second image frames picked up while the lens system is set in a wide-angle end position.

In the checking step, the axial correction angle is compared with a maximum correction angle of the angle adjustment of the first angle adjuster. The adjuster operating step includes a step of, if the axial correction angle is less than the maximum correction angle, carrying out the angle adjustment of the first optical axis. If the axial correction angle is equal to or more than the maximum correction angle, the angle adjustment of the first and second optical axes is carried out.

In the checking step, if the axial correction angle is equal to or more than the maximum correction angle, the axial correction angle is further compared with a total of maximum correction angles of the angle adjustment of the first and second angle adjusters. If the axial correction angle is equal to or more than the total of the maximum correction angles, the first and second image pickup units are disabled from image pickup.

Accordingly, an optical difference between two image pickup units can be corrected rapidly and by a simple structure, because it is checked whether the angle adjustment should be made for both of the first and second optical axes or for one thereof in the image pickup units.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
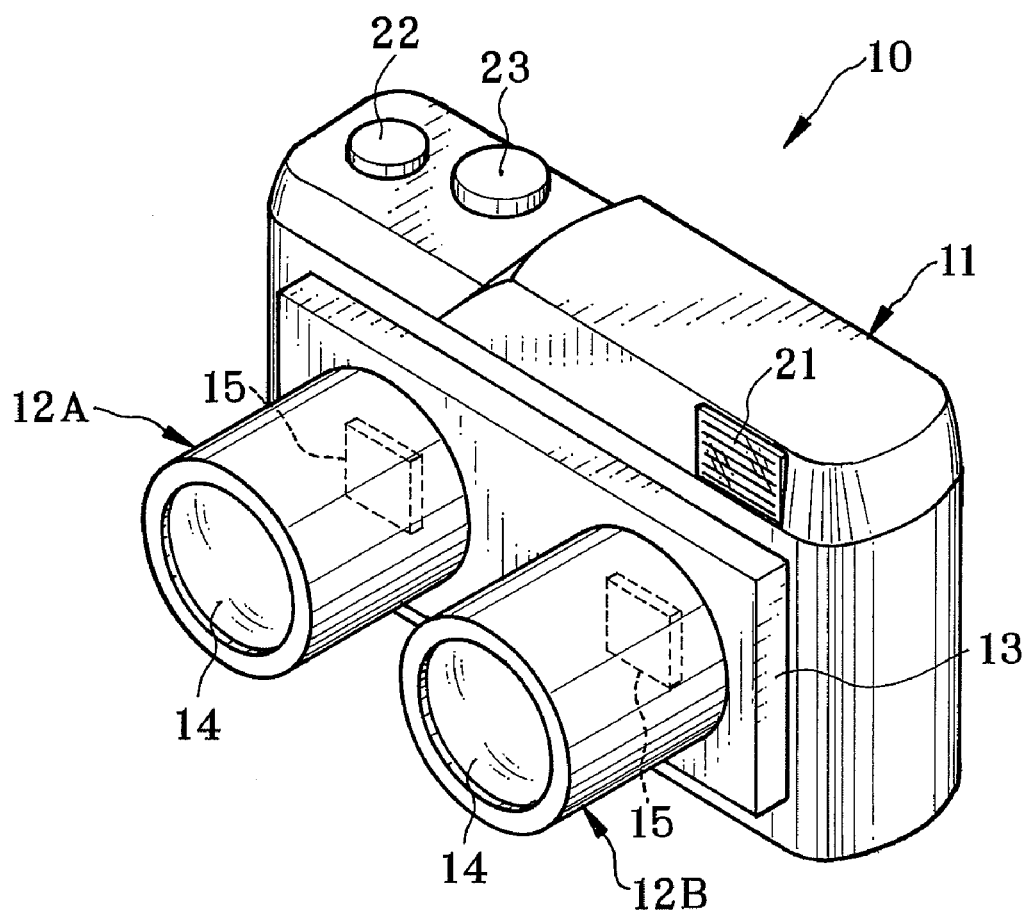
FIG. 1 is a perspective view illustrating a stereoscopic camera.

In FIG. 1, a stereoscopic camera 10 as stereoscopic image pickup apparatus includes a camera body 11, two image pickup units 12A and 12B, and a dual lens adapter 13 for mounting the image pickup units 12A and 12B on the camera body 11. Each of the image pickup units 12A and 12B includes a lens system 14 and a CCD image sensor 15 as image pickup device, which photographs an image by photoelectric conversion of object light focused by the lens system 14.

A flash light source 21 is disposed in a front surface of the camera body 11. The image pickup units 12A and 12B are mounted on the front surface by use of the dual lens adapter 13. An upper surface of the camera body 11 includes a shutter button 22 and a mode selector 23 or wheel. The shutter button 22 is depressed for image pickup. The mode selector 23 is rotated for selection of a mode.

Figure 2:
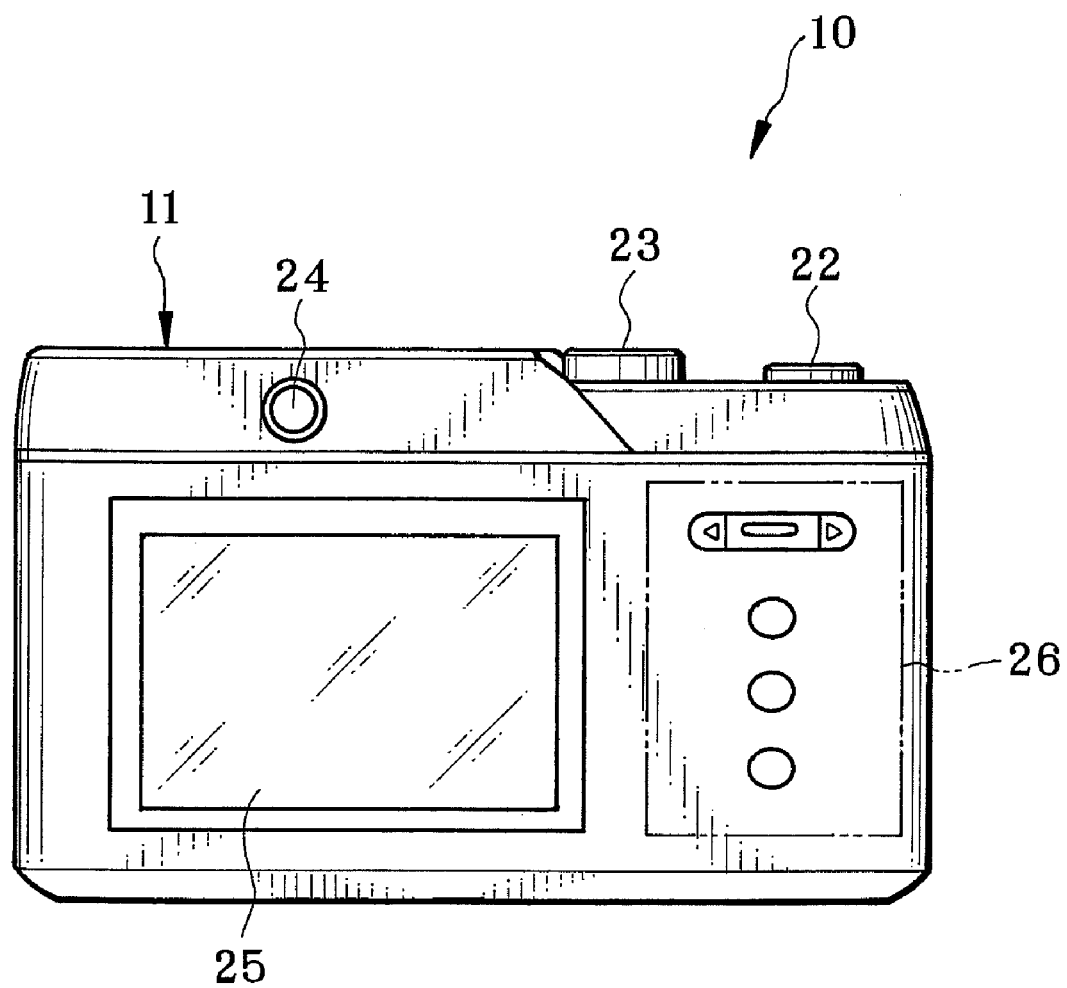
FIG. 2 is a rear elevation illustrating the stereoscopic camera.

In FIG. 2, a rear surface of the camera body 11 has a power button 24, an LCD display panel 25 and an input interface 26. The LCD display panel 25 displays an image, operation menus and other information. The input interface 26 includes a plurality of buttons or keys. Examples of buttons of the input interface 26 include a zoom button, cursor button, menu button, start button, cancel button and the like.

Figure 3:
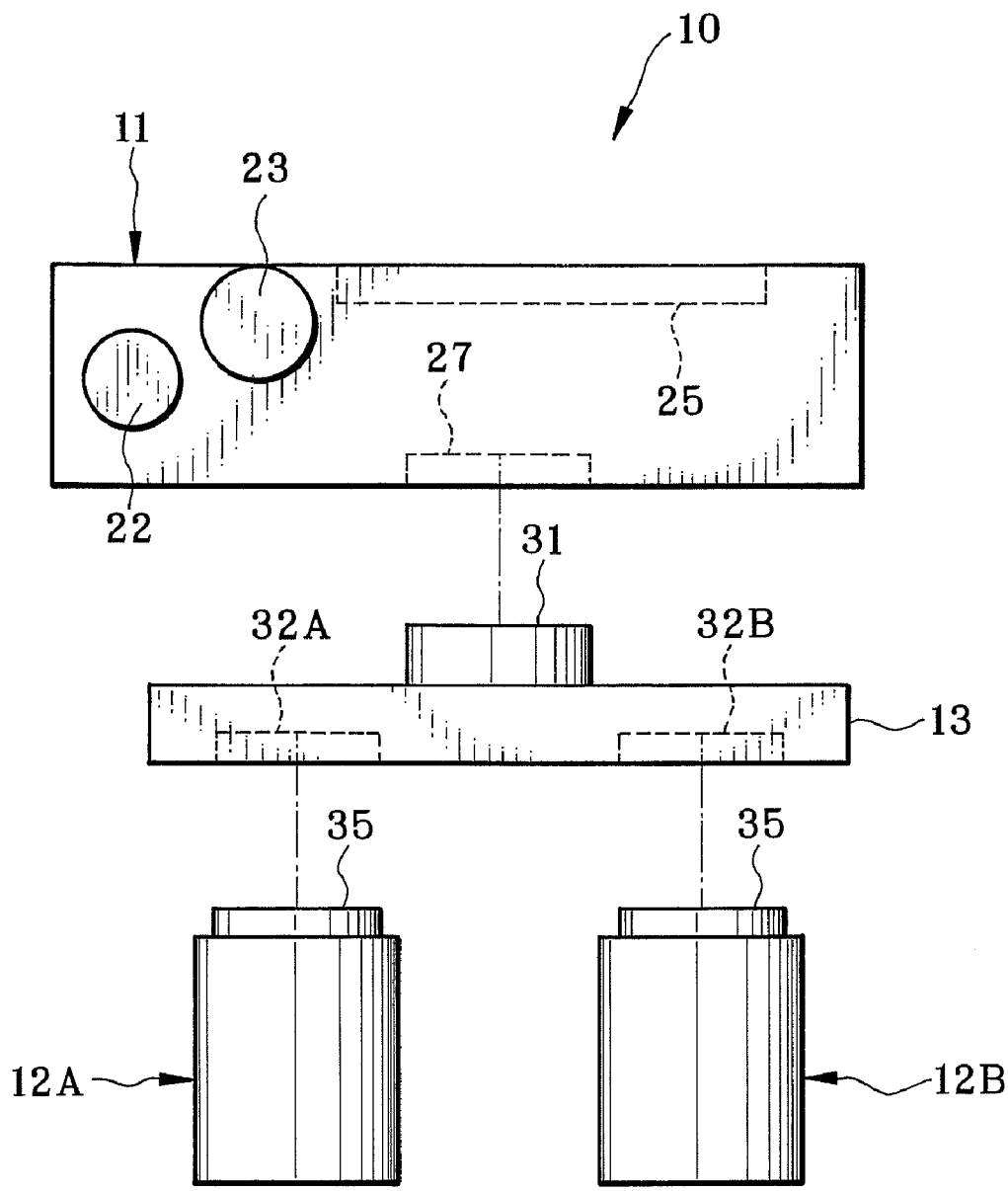
FIG. 3 is a top plan illustrating a combination of a camera body, image pickup units and dual lens adapter of the stereoscopic camera.

In FIG. 3, setting of the image pickup units 12A and 12B is illustrated. A mounting board 27 as coupling device is positioned in a front surface of the camera body 11. An example of the mounting board 27 has a structure with a bayonet channel.

A coupling mount 31 as coupling device is a portion formed with the rear surface of the dual lens adapter 13. The coupling mount 31 is inserted in the mounting board 27. An example of the coupling mount 31 has a structure with a bayonet lug. The coupling mount 31 is pushed into the mounting board 27 by positioning the bayonet lug in the bayonet channel, is rotated in the clockwise direction to fit the dual lens adapter 13 on the front surface of the camera body 11. Contacts of the mounting board 27 become connected with contacts of the coupling mount 31 for electric connection of the camera body 11 with the dual lens adapter 13.

Mounting boards 32A and 32B as coupling devices are disposed in the front surface of the dual lens adapter 13. A form of the mounting boards 32A and 32B is the same as that of the mounting board 27. Lens mounts 35 as coupling devices are rear portions of respectively the image pickup units 12A and 12B, and structurally the same as the coupling mount 31.

The lens mounts 35 are inserted in respectively the mounting boards 32A and 32B, to secure the image pickup units 12A and 12B on the dual lens adapter 13 fixedly. Contacts of the mounting boards 32A and 32B become connected with contacts of the lens mounts 35 for electric connection of the image pickup units 12A and 12B with the dual lens adapter 13.

Each of the image pickup units 12A and 12B is also engageable with the mounting board 27 directly, for the purpose of image pickup of a normal manner distinct from stereoscopic image pickup.

Figure 4:
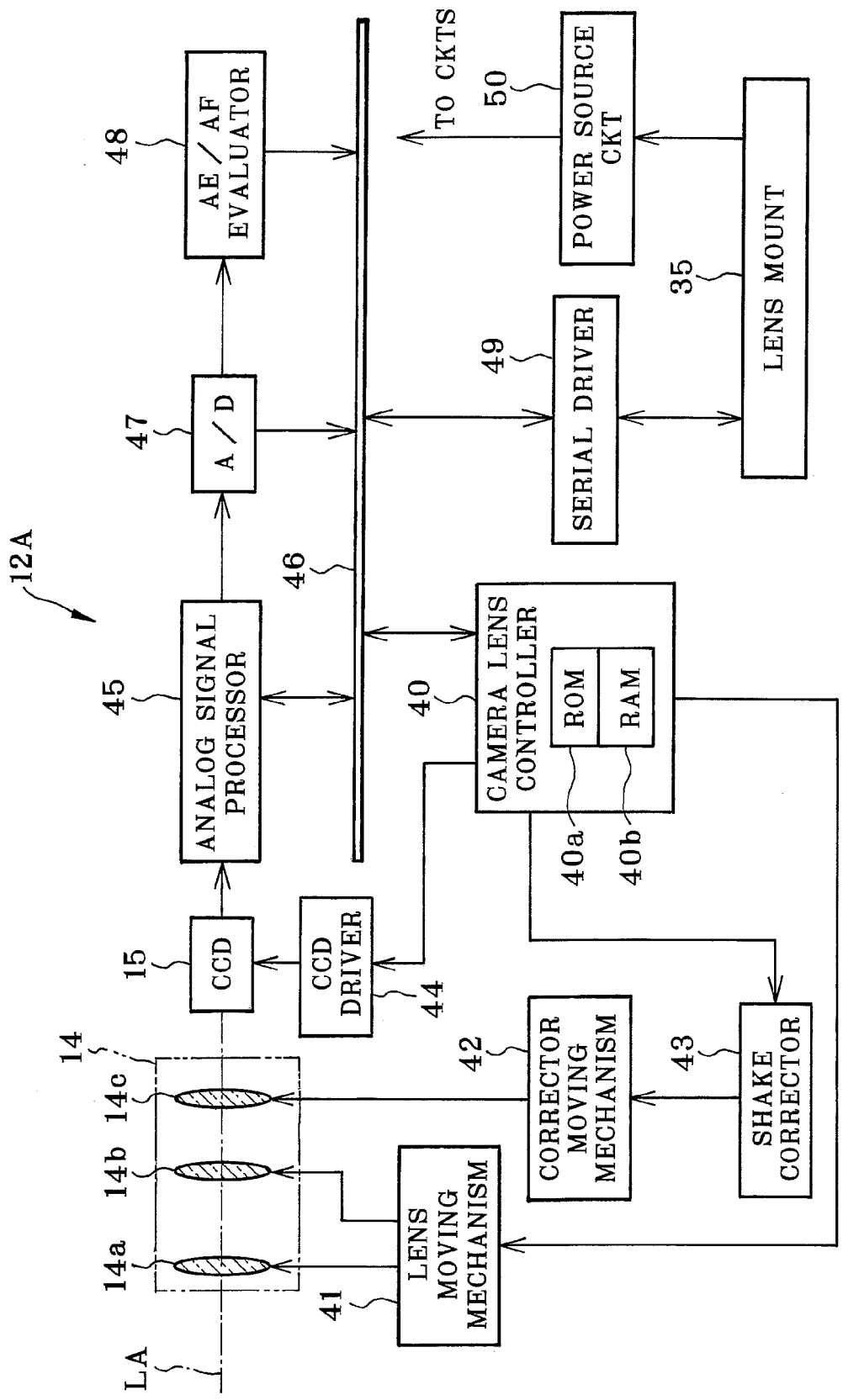
FIG. 4 is a block diagram illustrating a first image pickup unit.

In FIG. 4, circuit elements in the image pickup unit 12A are illustrated. A camera lens controller 40 is incorporated in the image pickup unit 12A and controls elements inside the same. A ROM 40a of the camera lens controller 40 stores a control program and control data. A RAM 40b of the camera lens controller 40 is a working memory for storing data in a temporary manner. A system controller 60 (See FIG. 6) sends a command signal to the camera lens controller 40, which controls various elements according to the control program and control data. Specification information is stored in the ROM 40a, and is information of the image pickup unit 12A, for example information of the lens system 14, CCD or the like.

The lens system 14 includes a variator lens/lens group 14a, a focusing lens/lens group 14b and a correction lens 14c. A lens moving mechanism 41 moves the variator lens/lens group 14a and the focusing lens/lens group 14b in the direction of the optical axis LA.

The lens moving mechanism 41 includes a zoom motor, a focus motor, and motor drivers for driving motors with drive signals. The camera lens controller 40 controls the lens moving mechanism 41 for moving the variator lens/lens group 14a and the focusing lens/lens group 14b in the direction of the optical axis LA.

The correction lens 14c corrects the optical axis LA of the lens system 14. A corrector moving mechanism 42 moves the correction lens 14c on a plane that is perpendicular to the optical axis LA. The corrector moving mechanism 42 includes a first motor for moving the correction lens 14c horizontally and a second motor for moving the correction lens 14c vertically. A shake corrector 43 is connected with the corrector moving mechanism 42.

The shake corrector 43 includes two gyro sensors for detecting an angular velocity of the shake of the optical axis LA. A first gyro sensor detects a horizontal component of the angular velocity. A second gyro sensor detects a vertical component of the angular velocity. The shake corrector 43 integrates output signals of the angular velocity components from the gyro sensors to obtain an angle of the shake, and calculates a shift amount of the correction lens 14c to compensate for the angle of the shake.

The shake corrector 43 generates a drive signal for a motor according to the shift amount, and sends the drive signal to the corrector moving mechanism 42. The corrector moving mechanism 42 shifts the correction lens 14c according to the drive signal, to correct the shake of the optical axis LA. The angle adjuster is constituted by the correction lens 14c, the corrector moving mechanism 42 and the shake corrector 43.

Also, the camera lens controller 40 controls the shake corrector 43 before the stereoscopic image pickup. The optical axes LA and LB of the image pickup units 12A and 12B are corrected at the location of the object, to position the optical axes LA and LB exactly at the object.

The CCD image sensor 15 is disposed behind the lens system 14. A CCD driver 44 connects the CCD image sensor 15 with the camera lens controller 40. The camera lens controller 40 sends a drive signal to the CCD driver 44 to drive the CCD image sensor 15. An object image is formed by the lens system 14, and is converted by the CCD image sensor 15 photoelectrically to output an image signal.

An analog signal processor 45 is connected with the CCD image sensor 15, and is supplied with an image signal. A data bus 46 connects the analog signal processor 45 to the camera lens controller 40 so as to control the analog signal processor 45. Various elements are connected with the data bus 46, including an A/D converter 47, an AE/AF evaluator 48 and a serial driver 49. Data can be transmitted and received between those elements by the data bus 46 in a condition controlled by the camera lens controller 40.

The analog signal processor 45 processes the image signal for elimination of noise and amplification, and outputs the processed image signal to the A/D converter 47. The A/D converter 47 converts the image signal as analog signal into a digital signal, which is output as image data.

The AE/AF evaluator 48 is connected with the A/D converter 47, and is supplied with the image data. An AE evaluation value is detected by the AE/AF evaluator 48 as information to optimize the exposure according to the image data, and is transmitted to the camera lens controller 40. The AE/AF evaluator 48 integrates a high frequency component of the image data, and obtains the integrated value as an AF evaluation value, which is sent to the camera lens controller 40.

When the shutter button 22 is depressed halfway, the camera lens controller 40 retrieves an AE evaluation value from the AE/AF evaluator 48, and controls an electronic shutter speed of the CCD image sensor 15 according to the AE evaluation value. In the embodiment, no aperture stop mechanism is used with the lens system 14. However, an aperture stop mechanism may be used in association with the lens system 14. The camera lens controller 40 can change a diameter of the aperture stop according to the AE evaluation value, so as to adjust an amount of the object light incident upon the CCD image sensor 15.

When the shutter button 22 is depressed halfway, the camera lens controller 40 controls the lens moving mechanism 41 to move the focusing lens/lens group 14b in the direction of the optical axis L1. During this movement, the AF evaluation value is retrieved from the AE/AF evaluator 48. The camera lens controller 40 stops the focusing lens/lens group 14b at the location where the AF evaluation value becomes the maximum as a peak.

The serial driver 49 is connected with contacts of the lens mount 35. The serial driver 49 converts image data from the A/D converter 47, control signal and other data into a serial signal. The converted data is transmitted by the serial driver 49 to the dual lens adapter 13 or the camera body 11 by use of the contacts of the lens mount 35. A system of the serial driver 49 for sending the image data is the LVDS (low voltage differential signaling) system.

The serial driver 49 receives a control signal or other data from the dual lens adapter 13 or the camera body 11, and converts the data from a serial signal to a parallel signal, which is sent to the camera lens controller 40.

A power source circuit 50 is connected with contacts of the lens mount 35. The camera body 11 supplies the power source circuit 50 with power, so as to power various elements included in the image pickup unit 12A. Note that an additional battery may be contained in the image pickup unit 12A. The power source circuit 50 may be powered by the additional battery. The image pickup unit 12B is constructed substantially in the same form as the image pickup unit 12A.

Figure 5:
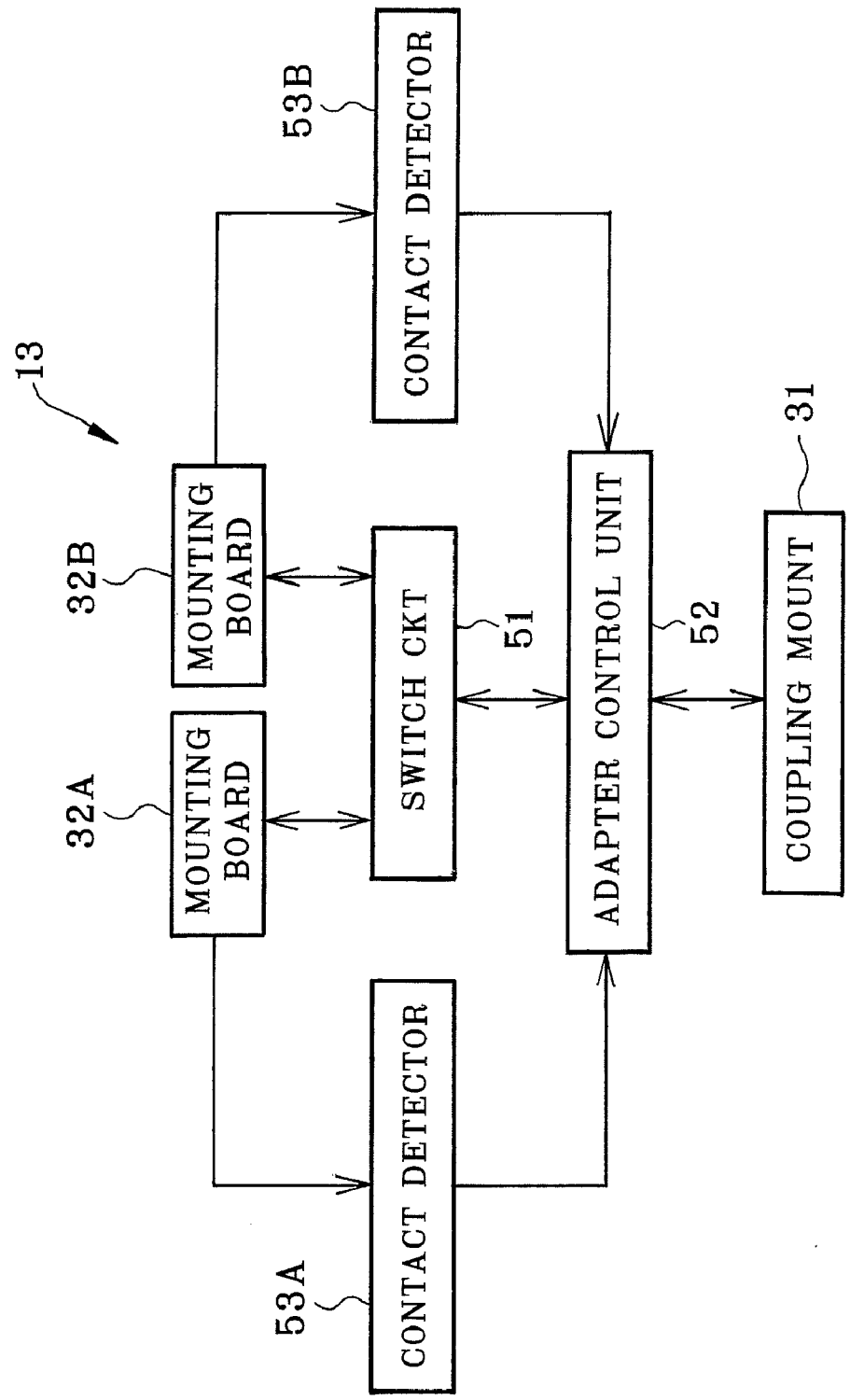
FIG. 5 is a block diagram illustrating the dual lens adapter.

In FIG. 5, circuit elements of the dual lens adapter 13 are illustrated. The dual lens adapter 13 has the coupling mount 31 and the mounting boards 32A and 32B, and includes a switch circuit 51, an adapter control unit 52, and contact detectors 53A and 53B. The switch circuit 51 is controlled by the adapter control unit 52, and switches the connection to the image pickup units 12A and 12B in a selective manner for transmission and reception of data. The contact detectors 53A and 53B electrically detect the connection with respectively the image pickup units 12A and 12B, and transmit the connection information to the adapter control unit 52.

Figure 6:
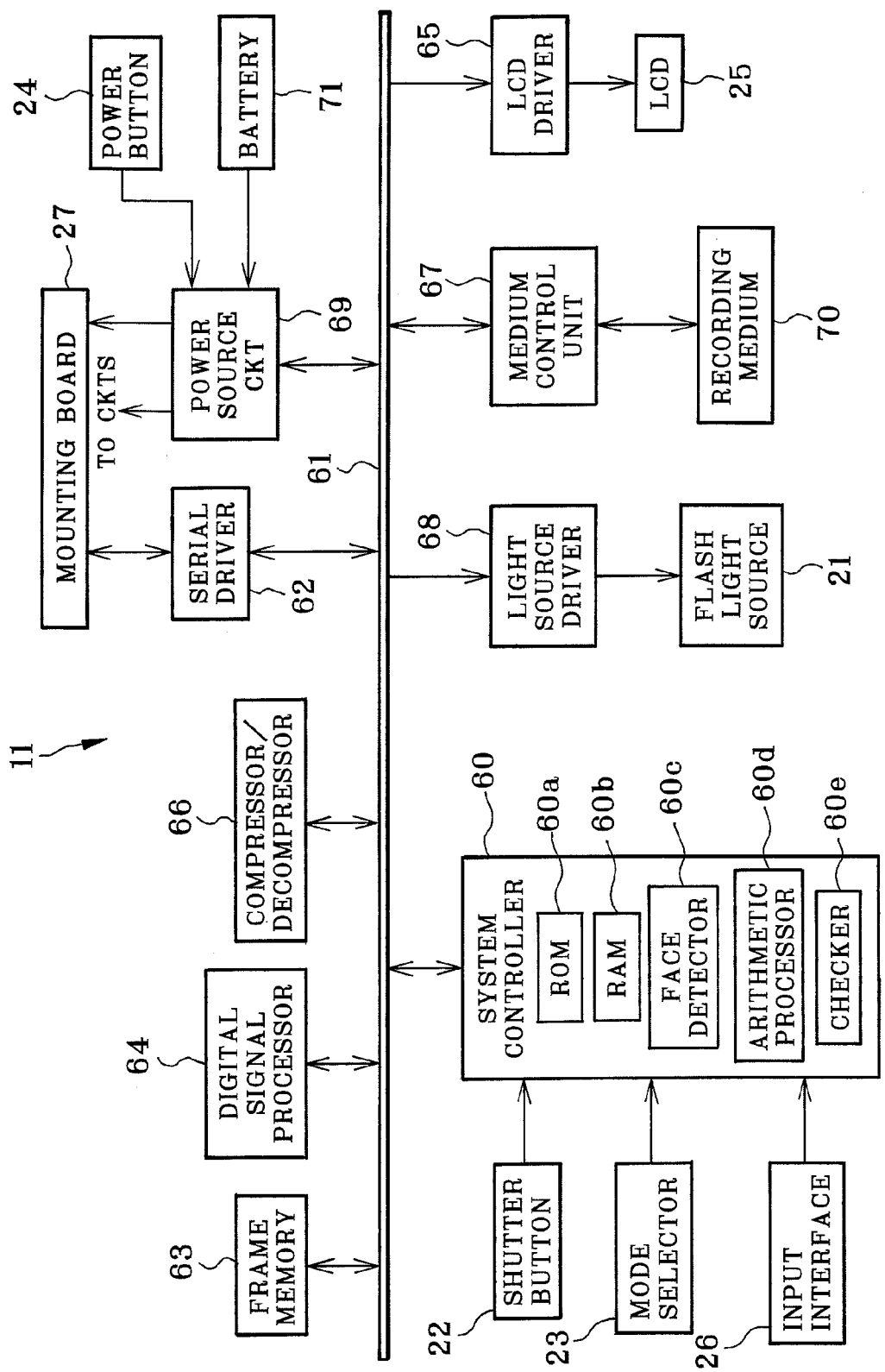
FIG. 6 is a block diagram illustrating the camera body.

Circuitry in the camera body 11 is described now by referring to FIG. 6. The system controller 60 is contained in the camera body 11 for control of various elements. A ROM 60a of the system controller 60 stores a control program and control data. A RAM 60b of the system controller 60 is a working memory for storing data in a temporary manner. The system controller 60 operates according to the control program and control data.

The shutter button 22, the mode selector 23 and the input interface 26 are connected with the system controller 60. Operation signals from those are input to the system controller 60, which performs tasks according to the operation signals.

The shutter button 22 is two step button of depression, and has first and second switches. When the shutter button 22 is depressed halfway, the first switch generates an on signal which is input to the system controller 60. Then the system controller 60 causes the image pickup units 12A and 12B to carry out the AF and AE control. When the shutter button 22 is depressed fully, the second switch generates an on signal which is input to the system controller 60. Then the system controller 60 causes the image pickup units 12A and 12B to pick up an image.

A data bus 61 connects various elements to the system controller 60, the elements including a serial driver 62, a frame memory 63, a digital signal processor 64, an LCD driver 65, a compressor/decompressor 66, a medium control unit 67, a light source driver 68, and a power source circuit 69. The system controller 60 controls those elements by use of the data bus 61. Data can be transmitted and received between those through the data bus 61.

The serial driver 62 is connected with the contact of the mounting board 27, receives data from the image pickup units 12A and 12B, and converts the data from the serial signal to a parallel signal. The system of reception of the image data of the serial driver 62 is the LVDS system. To transmit a control signal or other data to the image pickup units 12A and 12B, the serial driver 62 converts the data from the parallel signal to the serial signal before the transmission.

The serial driver 62, upon receiving image data from the image pickup units 12A and 12B, writes the image data to the frame memory 63. An example of the frame memory 63 is an SDRAM, and temporarily stores image data of a live image with a low definition, and image data of an image with a high definition to be recorded. The image data from the frame memory 63 is processed by the signal processor 64 for image processing, for example gradation conversion, white balance correction, sharpness correction, Y/C separation and the like. Also, the signal processor 64 combines image data from the image pickup units 12A and 12B, and creates stereoscopic image data of a stereoscopic image.

Before the image pickup in the image pickup mode, image data of a live image after the image processing is input to the LCD driver 65. The LCD driver 65 is controlled by the system controller 60 and causes the LCD display panel 25 to display the live image according to the image data.

When an image is picked up for recording, image data after the image processing is compressed by the compressor/decompressor 66 in a compression format of JPEG and the like. A recording medium or data storage 70 is accessed by the medium control unit 67, and stores the image data after the compression.

The light source driver 68 controls the flash emission of the flash light source 21. A battery 71 supplies the power source circuit 69 with power. The power button 24 inputs an on signal and off signal to the power source circuit 69 selectively. There is a DC/DC converter incorporated in the power source circuit 69. When the power source circuit 69 receives the on signal, the DC/DC converter changes supplied voltage from the battery 71 into a predetermined voltage, which is supplied to the camera body 11, the image pickup units 12A and 12B, and the dual lens adapter 13.

The system controller 60 includes a face detector 60c, an arithmetic processor 60d for determining a correction angle, and a checker 60e. The face detector 60c is supplied with image data read from the frame memory 63, and detects a facial portion from the images photographed by the image pickup units 12A and 12B. As a system of face detection of the face detector 60c, suitable known methods can be used. For example, pattern recognition is used, in which reference images of pattern recognition are stored in the ROM 60a, and a facial portion in images is detected by referring to the reference images.

The arithmetic processor 60d calculates a difference between face positions of the face in two images, and determines an axial correction angle required for optical coincidence of the two face positions, namely exact positioning of the axes LA and LB of the image pickup units 12A and 12B at the face image.

Figure 7A:
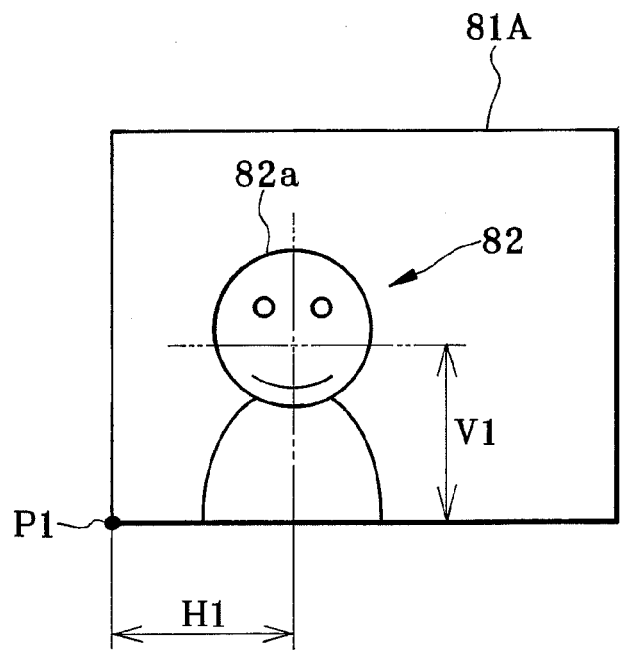
FIG. 7A is an explanatory view illustrating an image frame created by a first image pickup unit.

The calculation of axial correction angles is described now. In FIG. 7A, an image frame 81A is formed by image pickup in the image pickup unit 12A. As viewed from an original point P1, a horizontal distance H1 and a vertical distance V1 of a face or principal object 82a of an object 82 are obtained as its position in the image frame 81A. Examples of the horizontal distance H1 and vertical distance V1 are numbers of pixels counted from the original point P1.

Figure 7B:
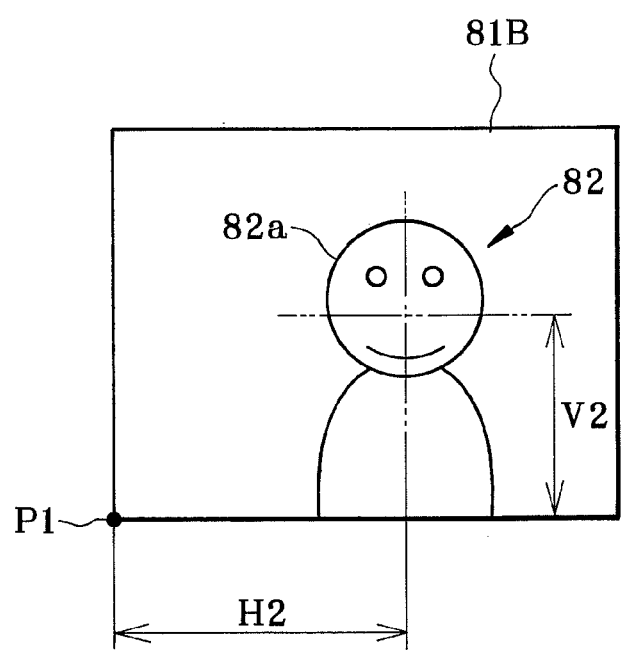
FIG. 7B is an explanatory view illustrating an image frame created by a second image pickup unit.

An image frame 81B created by the image pickup unit 12B is illustrated in FIG. 7B. A horizontal distance H2 and a vertical distance V2 of the face 82a are obtained as its position in the image frame 81B. Also, values of the difference of the face position is calculated as a horizontal position difference H=H2−H1, and a vertical position difference V=V2−V1.

Then the axial correction angle $\theta H = H \times KH$ (KH is a ratio of the horizontal angle of view to the pixel number in the horizontal direction) in the horizontal direction is determined according to the position shift amount H. The value KH is changeable according to the focal length f'. Also, the axial correction angle $\theta V = V \times KV$ (KV is a ratio of the vertical angle of view to the pixel number in the vertical direction) in the vertical direction is determined according to the position shift amount V. The value KV is changeable according to the focal length f'.

The checker 60e checks whether the axial correction angles $\theta H$ and $\theta V$ are smaller than the maximum correction angle of the image pickup units 12A and 12B, or maximum angle of the correction. The maximum correction angle is predetermined according to the maximum shift amount of the correction lens 14c.

If the axial correction angle is found smaller than the maximum correction angle, then the system controller 60 controls only one of the image pickup units 12A and 12B for adjusting the optical axis. If the axial correction angle is found equal to or greater than the maximum correction angle, then the checker 60e checks whether the axial correction angle is smaller than a total of the maximum correction angles of the image pickup units 12A and 12B. If it is, then the system controller 60 controls both of the image pickup units 12A and 12B to adjust the optical axes.

Figure 8:
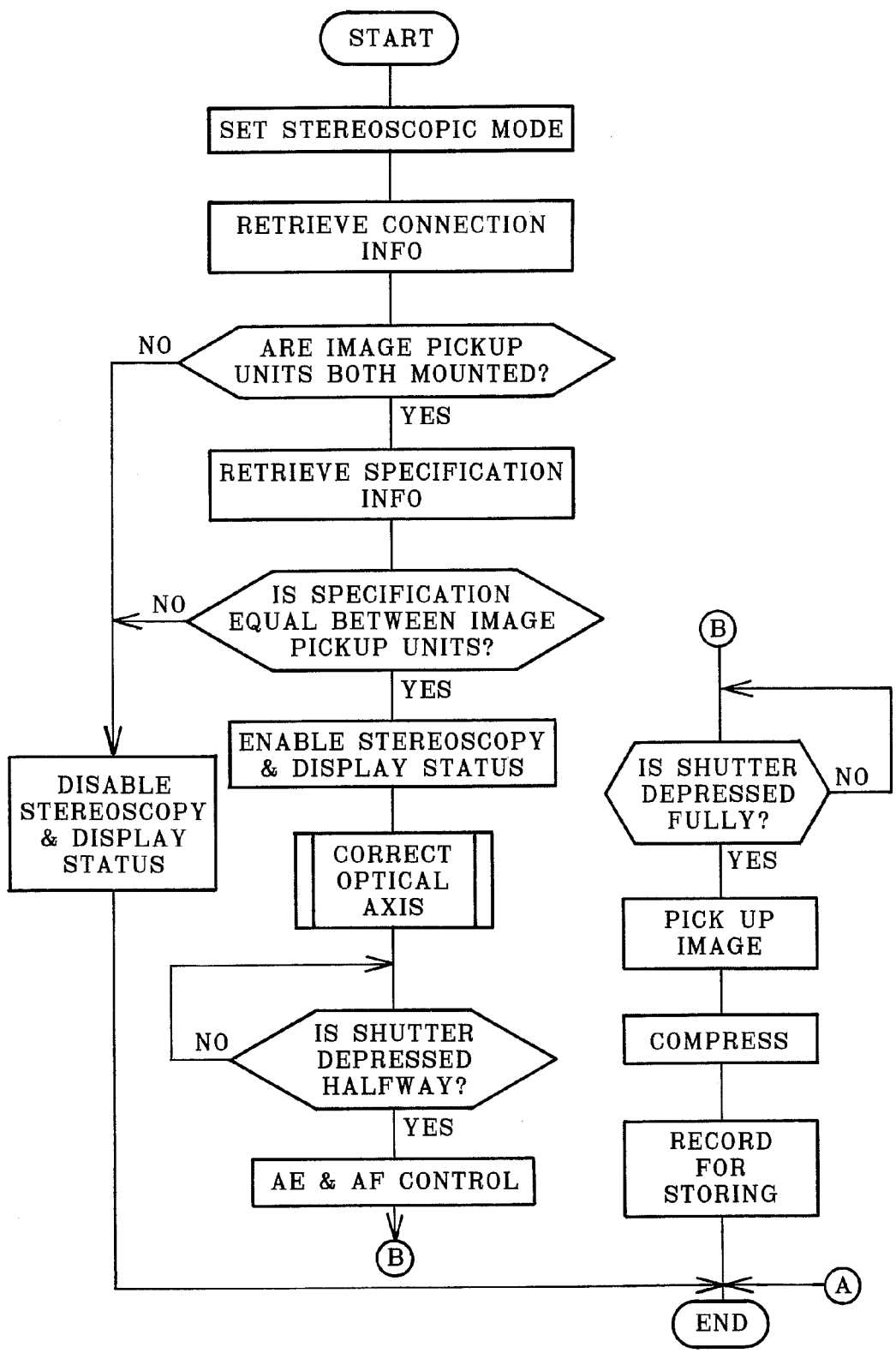
FIG. 8 is a flow chart illustrating spectroscopic image pickup.

The operation of stereoscopic image pickup of the stereoscopic camera 10 is described now with reference to the flow in FIG. 8. At first, a user operates the input interface 26 to select a stereoscopic mode. A control signal is sent from the input interface 26 to the system controller 60 which sets the stereoscopic mode.

The system controller 60 retrieves connection information from the adapter control unit 52, and checks whether both of the image pickup units 12A and 12B are fitted on the dual lens adapter 13. If they are not, then the system controller 60 controls the LCD driver 65 to cause the LCD display panel 25 to display a message of "Stereo Unavailable".

If both of the image pickup units 12A and 12B are found mounted, then the system controller 60 retrieves specification information of the image pickup units 12A and 12B by use of the adapter control unit 52, and checks whether the specification information is equal between the image pickup units 12A and 12B. If it is not, then the system controller 60 causes the LCD driver 65 to display a message of "Stereo Unavailable" on the LCD display panel 25.

If the specification information is found equal between the image pickup units 12A and 12B, the system controller 60 causes the LCD driver 65 to display a message of "Stereo Available" on the LCD display panel 25, and performs a task of correcting the optical axes.

Figure 9:
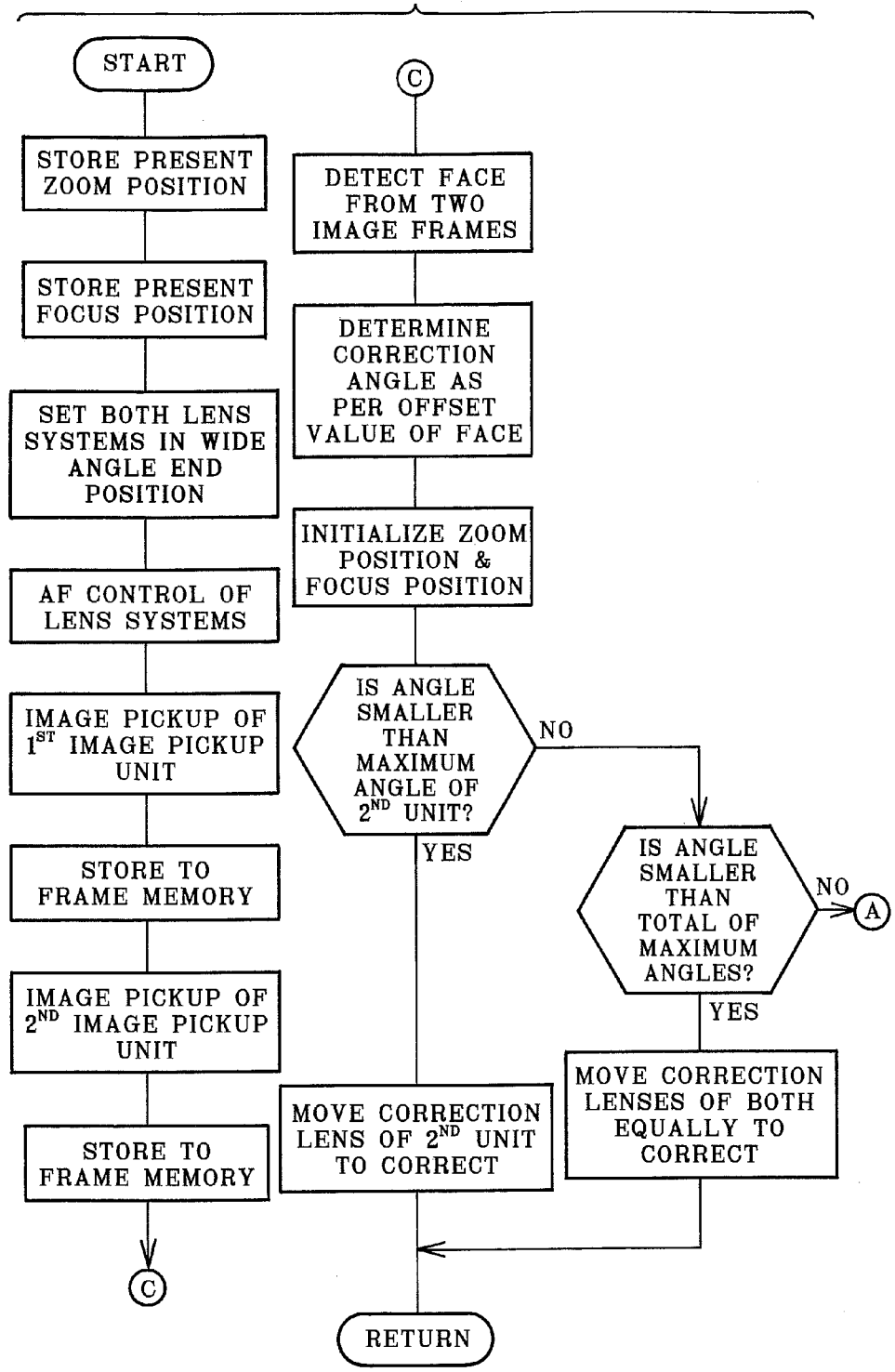
FIG. 9 is a flow chart illustrating an optical axial correction.

Correction of the optical axis is described now by referring to FIG. 9. The system controller 60 retrieves zoom position information from the image pickup units 12A and 12B, and writes the same to the RAM 60b. Focus position information is retrieved by the system controller 60 from the image pickup units 12A and 12B, and is written to the RAM 60b.

Figure 10A:
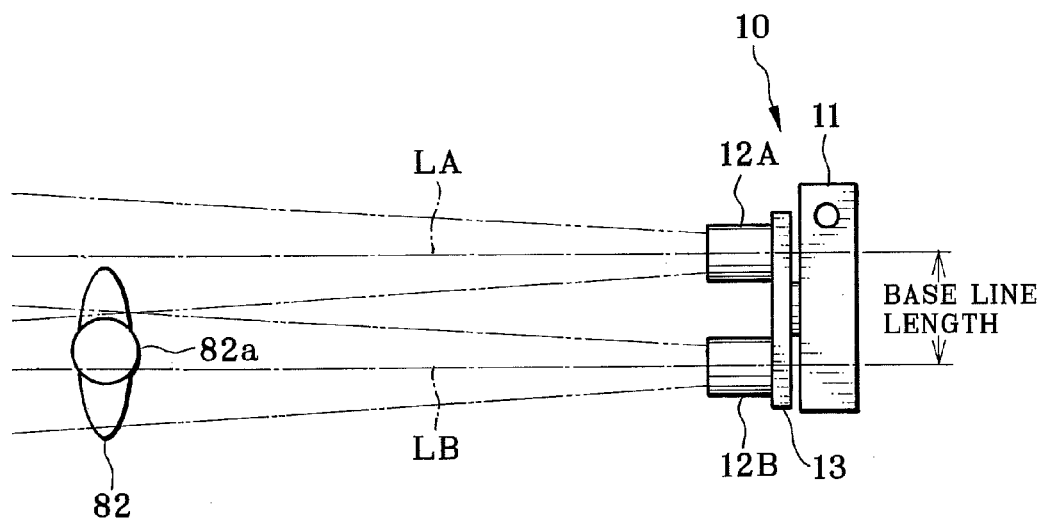
FIG. 10A is an explanatory view in a plan illustrating an angle of view of the spectroscopic camera in which the lens system is set in a telephoto end position.
Figure 10B:
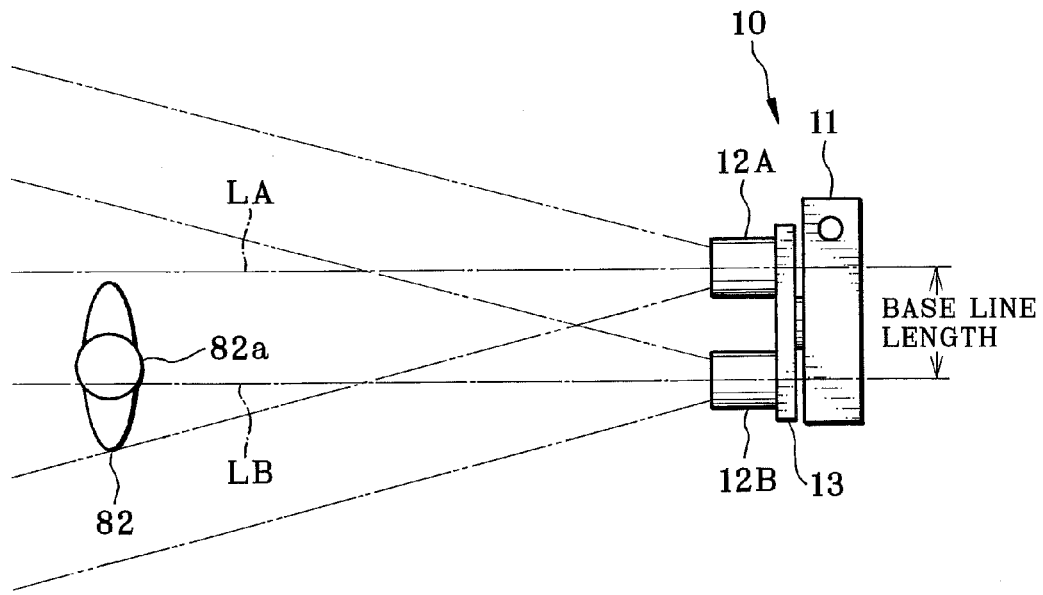
FIG. 10B is an explanatory view in a plan illustrating an angle of view of the spectroscopic camera in which the lens system is set in a wide-angle end position.

After this, the system controller 60 controls the image pickup units 12A and 12B to move the variator lens/lens group 14a to the wide-angle end position. The reason for moving the variator lens/lens group 14a to the wide-angle end position is described now. In FIG. 10A, the face 82a of the object 82 is located partially outside the angle of views of the image pickup unit 12A. This is because the variator lens/lens group 14a is set in an intermediate point which is shifted from the wide-angle end position toward the telephoto end position. In FIG. 10B, a state of setting the variator lens/lens group 14a in the wide-angle end position in both of the image pickup units 12A and 12B is illustrated. The face or principal object 82a of the object 82 is located inside the angle of view of both of the image pickup units 12A and 12B. Accordingly, the face 82a can be detected reliably by the pattern recognition.

After moving the variator lens/lens group 14a to the wide-angle end position as illustrated in FIG. 10B, the system controller 60 carries out the AF control in the image pickup units 12A and 12B. Note that the AE control may be simultaneous with the AF control.

The system controller 60, in consideration of the specification information, designates a first one of the image pickup units 12A and 12B as a main lens unit, and a second one of those as a sub lens unit. The adapter control unit 52 is controlled by the system controller 60 to set the switch circuit 51 on the side of the image pickup unit 12A or the designated main lens unit.

After the changeover to the image pickup unit 12A as main lens unit, the system controller 60 controls the image pickup unit 12A for image pickup. Image data is written to the frame memory 63. Also, the system controller 60 causes the adapter control unit 52 to set the switch circuit 51 for changeover with the image pickup unit 12B as sub lens unit. Then the system controller 60 controls the image pickup unit 12B for image pickup. Image data is obtained and written to the frame memory 63.

After this, the face detector 60c detects a face from images according to image data read from the frame memory 63. The arithmetic processor 60d determines a shift amount H in the horizontal direction and a shift amount V in the vertical direction according to the face positions of the images. Also, the arithmetic processor 60d determines an axial correction angle θH in the horizontal direction and an axial correction angle θV in the vertical direction according to the shift amounts. The following is a situation in which the axial correction angle θH occurs for correction.

After the axial correction angle θH is determined, the system controller 60 controls the image pickup units 12A and 12B according to the zoom position and focus positions stored in the RAM 60b. The variator lens/lens group 14a and the focusing lens/lens group 14b in the image pickup units 12A and 12B are moved to their initial positions.

The checker 60e checks whether the horizontal axial correction angle θH retrieved by the arithmetic processor 60d is smaller than the maximum correction angle of the sub lens unit. If it is, a shift amount SH (=KL×θH) according to the horizontal axial correction angle θH is calculated by the system controller 60. Note that KL is a ratio of the lens shift amount to the horizontal axial correction angle θH, and is a mechanical value changeable according to the focal length f'.

Figure 11A:
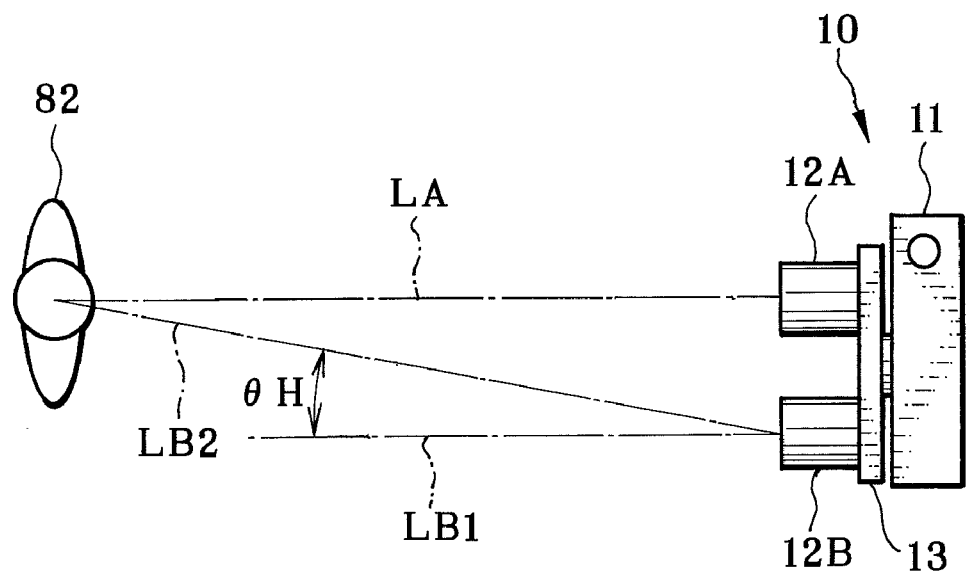
FIG. 11A is an explanatory view in a plan illustrating the optical axis correction only by the first image pickup unit.

The system controller 60 controls the image pickup unit 12B as sub lens unit, causes the correction lens 14c to move at the shift amount SH. In FIG. 11A, the initial optical axis LB1 is corrected by the angle θH, to cause the optical axis LA exactly to pass the object 82 in the same manner as the optical axis LB2. The processing of the correction is completed.

If the horizontal axial correction angle θH retrieved by the arithmetic processor 60d is found equal to or greater than the maximum correction angle of the sub lens unit, then the checker 60e checks whether the horizontal axial correction angle θH is smaller than the total of the maximum correction angles of the image pickup units 12A and 12B. If it is not, then the system controller 60 controls the LCD driver 65 to cause the LCD display panel 25 to display a message of "Stereo Unavailable".

Figure 11B:
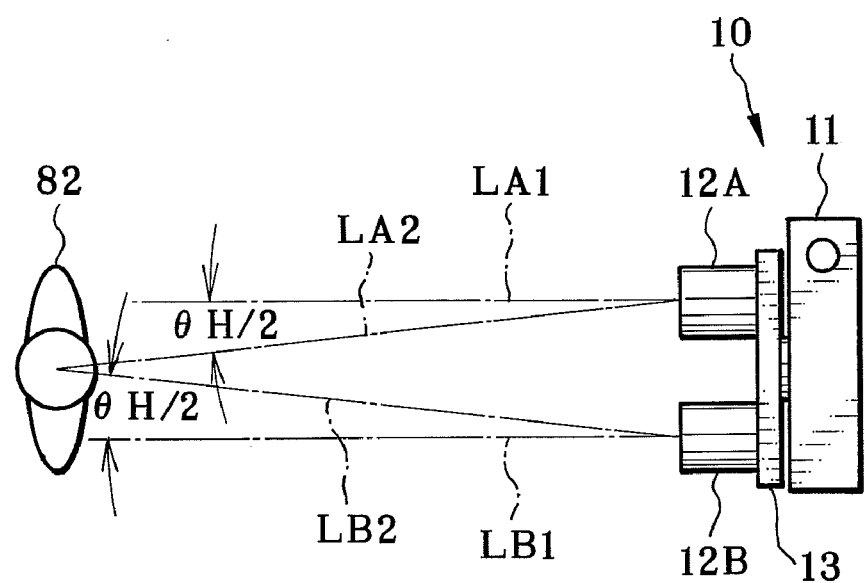
FIG. 11B is an explanatory view in a plan illustrating the optical axis correction by both of the image pickup units.

If the axial correction angle is found smaller than the total of the maximum correction angles, then the correction lenses 14c of the image pickup units 12A and 12B are shifted equally by the shift amount corresponding to the maximum correction angle θH. In FIG. 11B, the initial optical axis LA1 is corrected by the angle θH/2. Also, the initial optical axis LB1 is corrected by the angle θH/2, exactly to direct the optical axes LA2 and LB2 at the object 82. Thus, the optical axis correction is completed.

It is preferable to correct the optical axes LA and LB of the image pickup units 12A and 12B equally, because the object distance can be equal to set the in-focus position equal. Also, there is an advantage in that a shift amount of the correction lens 14c can be relatively small, because of the equal correction of the optical axes LA and LB. Influence of distortion or the like can be reduced.

In the above-described correction, only the horizontal axial correction angle θH exists for correction. If there is a vertical axial correction angle θV, it is possible to shift the correction lens 14c of the image pickup units 12A and 12B in the vertical direction according to the vertical axial correction angle θV.

In a manner similar to the horizontal correction, a shift amount SV (=KL×θV) according to the vertical axial correction angle θV is calculated. Note that KL is a ratio of the lens shift amount to the vertical axial correction angle θV, and is a mechanical value changeable according to the focal length f'.

After the correction, the system controller 60 checks whether the shutter button 22 is depressed halfway. This check is based on occurrence of reception of an on signal form the first switch of the shutter button 22.

If the shutter button 22 is found not depressed halfway, then this check is repeated for plural times. If the shutter button 22 is found depressed halfway, then the system controller 60 controls the image pickup units 12A and 12B to carry out AE and AF control.

After the AE and AF control is completed, the system controller 60 checks whether the shutter button 22 is depressed fully. This is based on occurrence of reception of an on signal from the second switch of the shutter button 22.

If the shutter button 22 is not depressed fully, then this check is repeated for plural times. If the shutter button 22 is found depressed fully, then the system controller 60 controls the image pickup units 12A and 12B for image pickup. Also, the adapter control unit 52 is controlled by the system controller 60 to change over the switch circuit 51 suitably. Image data obtained by the image pickup units 12A and 12B are written to the frame memory 63.

The system controller 60 controls the various circuit elements to process the image data in the image processing. The processed image data is compressed, and then written to the recording medium 70 before terminating the stereoscopic image pickup. Note that the image data from the image pickup units 12A and 12B can be recorded and stored separately, or can be recorded as stereoscopic image data produced by combining the two image data.

In the above embodiment, the image pickup units are initially separate and engageable with the camera body. However, two image pickup units may be inseparable portions of the camera body. Also, two image pickup devices can be incorporated in an adapter. Two lens units may be fitted on the adapter in front of the image pickup device and in an engageable manner.

In the embodiment, the face or principal object 82a as specific object to be detected is a face of a person. However, a specific object to be detected in an image frame may be an object other than a face according to the invention in which the optical axes are corrected.

In the above embodiment, the shake corrector 43 is used for angle adjustment. However, an angle adjuster may be constituted by other elements, for example a moving mechanism for moving the image pickup device to adjust the angle of the optical axis.

In the above embodiment, the switch circuit 51 is incorporated in the dual lens adapter 13. However, the switch circuit 51 may not be used, typically when the number of the contacts in the mounting boards and lens mounts is great enough for simultaneous transmission and reception of data in connection with the image pickup units 12A and 12B.

In the above embodiment, the face detector 60c, the arithmetic processor 60d and the checker 60e are incorporated in the system controller. However, the face detector 60c, the arithmetic processor 60d and the checker 60e may be elements additional to the system controller. Also, operation of the face detector 60c, the arithmetic processor 60d and the checker 60e can be execution of a program.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A stereoscopic image pickup apparatus comprising:
   a first image pickup unit, including a first lens system having a first optical axis, and a first image pickup device for generating an image signal of a first image frame by photoelectrically converting an object image;
   a second image pickup unit, including a second lens system having a second optical axis, and a second image pickup device for generating an image signal of a second image frame by photoelectrically converting an object image;
   first and second angle adjusters for angle adjustment of respectively said first and second optical axes;
   an object detector for detecting a principal object in said first and second image frames formed before stereoscopic image pickup;
   an arithmetic processor for obtaining a shift amount of said principal object between first and second image frames, and for determining an axial correction angle according to said shift amount;
   a checker for checking whether said angle adjustment with said axial correction angle should be made for both of said first and second optical axes or for one thereof; and
   a controller for operating at least one of said first and second angle adjusters in response to a result from said checker, for positioning said principal object equally between said first and second image frames optically by adjusting at least one of said first and second optical axes according to said axial correction angle;
   wherein if said axial correction angle is equal to or more than a total of maximum correction angles of said first and second angle adjusters, said controller disables said first and second image pickup units from image pickup.

2. A stereoscopic image pickup apparatus as defined in claim 1, wherein said first and second lens systems are zoom lens systems, and said object detector detects said principal object in said first and second image frames picked up while said zoom lens systems are set in a wide-angle end position by zooming.

3. A stereoscopic image pickup apparatus as defined in claim 2, wherein said checker compares said axial correction angle with a maximum correction angle of said angle adjustment of said first angle adjuster, and if said axial correction angle is less than said maximum correction angle, determines carrying out said angle adjustment of said first optical axis, and if said axial correction angle is equal to or more than said maximum correction angle, determines carrying out said angle adjustment of said first and second optical axes.

4. A stereoscopic image pickup apparatus as defined in claim 1, wherein each of said first and second lens systems includes a correction lens shiftable in a plane perpendicular to said first and second optical axes for said angle adjustment.

5. A stereoscopic image pickup apparatus as defined in claim 4, wherein each of said first and second angle adjusters is constituted by a shake corrector for detecting a shake and for shifting said correction lens according to an amount of said detected shake.

6. A stereoscopic image pickup apparatus as defined in claim 4, wherein said principal object is a human face, and said object detector is a face detector.

7. A stereoscopic image pickup apparatus as defined in claim 4, further comprising:
   a first component having said first image pickup unit and said first angle adjuster; and a second component having said second image pickup unit and said second angle adjuster.

8. A stereoscopic image pickup apparatus as defined in claim 7, further comprising:
a dual lens adapter for supporting said first and second components; and
a camera body on which said dual lens adapter is mounted, said camera body being adapted to recording information of said first and second image frames formed by said first and second image pickup units after said angle adjustment and transmitted through said dual lens adapter.

9. A stereoscopic image pickup apparatus as defined in claim 8, wherein said camera body has said object detector, said arithmetic processor, said checker and said controller.

10. A stereoscopic image pickup apparatus as defined in claim 9, further comprising:
first and second coupling devices for mounting respectively said first and second image pickup units on said dual lens adapter;
a third coupling device for mounting said dual lens adapter on said camera body;
wherein said third coupling device has a shape of compatibility with each of said first and second coupling devices, and in a normal mode without adapter application, said first and second image pickup units are selectively mountable on said camera body directly.

11. An optical axis adjusting method for a stereoscopic image pickup apparatus including a first image pickup unit having a first lens system and a first image pickup device, and a second image pickup unit having a second lens system and a second image pickup device, said optical axis adjusting method comprising steps of:
before stereoscopic image pickup, picking up an object with said first and second image pickup units to form first and second image frames;
detecting a principal object in said first and second image frames;
obtaining a shift amount of said principal object between first and second image frames;
determining an axial correction angle according to said shift amount;
checking whether angle adjustment should be made for both of first and second optical axes of respectively said first and second lens systems or for one thereof;
in response to a result of said checking step, positioning said principal object equally between said first and second image frames optically by adjusting at least one of said first and second optical axes according to said axial correction angle;
wherein in said checking step, said axial correction angle is compared with a maximum correction angle of said first lens system;
wherein in said checking step, said axial correction angle is further compared with a total of said maximum correction angles of said first and second lens systems;
if said axial correction angle is equal to or more than said total of said maximum correction angles, said first and second image pickup units are disabled from image pickup.

12. An optical axis adjusting method as defined in claim 11, wherein said first and second lens systems are zoom lens systems, and in said object detecting step, said principal object is detected in said first and second image frames picked up while said zoom lens systems are set in a wide-angle end position by 20 zooming.

13. An optical axis adjusting method as defined in claim 11, wherein
said adjusting step includes:
if said axial correction angle is less than said maximum correction angle, carrying out said angle adjustment of said first optical axis;
if said axial correction angle is equal to or more than said maximum correction angle, carrying out said angle adjustment of said first and second optical axes.

* * * * *